United States Patent
Fleury (10) Patent No.: US 9,869,886 B2
(45) Date of Patent: Jan. 16, 2018

(54) ADAPTIVE SPECTACLES FOR MOTOR VEHICLE DRIVERS OR PASSENGERS

(71) Applicant: Valeo Vision, Bobigny (FR)

(72) Inventor: Benoist Fleury, Vincennes (FR)

(73) Assignee: VALEO VISION, Bobigny (FR)

( * ) Notice: Subject to any disclaimer, the term of this patent is extended or adjusted under 35 U.S.C. 154(b) by 407 days.

(21) Appl. No.: 14/385,701

(22) PCT Filed: Mar. 22, 2013

(86) PCT No.: PCT/EP2013/056042
§ 371 (c)(1),
(2) Date: Sep. 16, 2014

(87) PCT Pub. No.: WO2013/144003
PCT Pub. Date: Oct. 3, 2013

(65) Prior Publication Data
US 2015/0062469 A1    Mar. 5, 2015

(30) Foreign Application Priority Data

Mar. 26, 2012    (FR) ...................................... 12 52678

(51) Int. Cl.
*G02C 7/10* (2006.01)
*G02B 5/23* (2006.01)
(Continued)

(52) U.S. Cl.
CPC .............. *G02C 7/101* (2013.01); *B60J 3/04* (2013.01); *B60Q 1/143* (2013.01); *G01J 1/4204* (2013.01); *G02B 5/23* (2013.01); *G02C 7/10* (2013.01)

(58) Field of Classification Search
CPC ........ G02C 7/101; G02C 11/10; G02C 7/102; G02C 7/027; G02C 13/003; G02C 13/005; G02C 7/024; G02C 7/083; G02B 5/23; G02B 7/285; G02B 1/041; G02B 2027/0118
USPC ............ 351/159.61, 159.74, 159.39, 159.01, 351/159.03, 159.75, 159.49, 159.65, 233; 359/238, 241, 265
See application file for complete search history.

(56) References Cited

U.S. PATENT DOCUMENTS 3,961,181 A    6/1976   Golden
4,848,890 A    7/1989   Horn
(Continued)

FOREIGN PATENT DOCUMENTS

EP    0459433 A1    12/1991
EP    0498143 A1    8/1992
(Continued)

*Primary Examiner* — Ricky Mack
*Assistant Examiner* — Daniele Manikeu
(74) *Attorney, Agent, or Firm* — Oblon, McClelland, Maier & Neustadt, L.L.P.

(57) ABSTRACT

Adaptive glasses for drivers or passengers of a motor vehicle, the glasses comprising lenses having a screen whose coefficient of transmission is variable between a maximum value ($CT_{MAX}$) and a minimum value ($CT_{min}$). According to one embodiment of the invention, the coefficient of transmission (CT) of the glasses lenses (28) is controlled according to a wireless communication protocol.

13 Claims, 7 Drawing Sheets

(51) Int. Cl.
*B60J 3/04* (2006.01)
*B60Q 1/14* (2006.01)
*G01J 1/42* (2006.01)

(56) References Cited

U.S. PATENT DOCUMENTS

| | | | |
|---|---|---|---|
| 5,258,607 | A | 11/1993 | Agostini et al. |
| 5,276,539 | A | 1/1994 | Humphrey |
| 7,970,172 | B1 | 6/2011 | Hendrickson |
| 8,233,102 | B2 | 7/2012 | Burlingame et al. |
| 2007/0285759 | A1* | 12/2007 | Ash ............... B60J 3/04 359/275 |
| 2009/0213282 | A1 | 8/2009 | Burlingame et al. |
| 2009/0213283 | A1 | 8/2009 | Burlingame et al. |
| 2010/0161177 | A1 | 6/2010 | Yuter |
| 2011/0007378 | A1* | 1/2011 | Lackmann ......... B60K 35/00 359/267 |
| 2011/0242480 | A1* | 10/2011 | Reichow ............ G02C 5/10 351/159.6 |
| 2011/0288725 | A1 | 11/2011 | Yuter |
| 2012/0057225 | A1* | 3/2012 | Zakirullin ............ E06B 9/24 359/359 |
| 2012/0133315 | A1* | 5/2012 | Berman ............. E06B 9/322 318/480 |
| 2012/0303214 | A1 | 11/2012 | Yuter |

FOREIGN PATENT DOCUMENTS

| | | |
|---|---|---|
| FR | 2846756 A1 | 5/2004 |
| GB | 2445365 A | 7/2008 |
| WO | 9210130 A1 | 6/1992 |
| WO | 9620846 A1 | 7/1996 |

* cited by examiner

ADAPTIVE SPECTACLES FOR MOTOR VEHICLE DRIVERS OR PASSENGERS

CROSS-REFERENCE TO RELATED APPLICATIONS

This application is the U.S. National Phase application of PCT/EP2013/056042 filed Mar. 22, 2013, which claims priority to French Application No. 1252678 filed Mar. 26, 2012, which applications are incorporated herein by reference and made a part hereof.

BACKGROUND OF THE INVENTION

1. Field of the Invention

The present invention relates to glasses adapted to be worn by motor vehicle drivers and/or passengers, to provide them with an improved view of the road scene in front of the vehicle occupied by them.

2. Description of the Related Art

There are some situations in which one or more elements present in the road scene may interfere with a clear view of this road scene, and, in particular, may dazzle the driver or passengers. Although the passengers may look away from the road scene to avoid being dazzled, the driver cannot afford to take his eyes off the road, for evident reasons of safety.

These situations may be encountered in daytime, when the external brightness is variable to a considerable degree, for example in sunny weather, when various events may alternatively illuminate the road scene strongly or darken it.

These situations may also be encountered at nighttime, when the external brightness is low, such that low beam headlights (also called "statutory" lights) must be switched on.

The light beams emitted by lighting devices fitted to vehicles are governed by international regulations which specify the maximum and minimum intensities to be used, for example as measured on a screen placed at a distance from, and in the axis of, the lighting devices. In the specific case of low beam headlights, the aim of these regulations is, simultaneously:
  to enable the driver of the vehicle fitted with this lighting device to have satisfactory illumination of the road scene on which he is traveling, so that he can perceive his environment in the best possible conditions, and
  to avoid dazzling the drivers of other vehicles, regardless of whether they are traveling in the opposite direction (approaching vehicles) or in the same direction (followed vehicles).

If the low beam headlights of an approaching vehicle are switched on and the headlights emitting the low beam are poorly adjusted or even slightly out of adjustment, this will be enough to cause dazzling, since the low beam of the approaching vehicle will include light rays higher than an upper regulatory limit called the cut-off level, these rays being prohibited by the regulations.

Moreover, even if the lighting devices of the approaching vehicles are correctly adjusted, the emitted beam may still create dazzle if the outer lenses of these devices, through which the light rays pass, are soiled. This is because any soiling present on the outer lens forms centers of light diffusion, that is to say secondary light sources, which emit light in all directions. The greater the soiling of the outer lens, the greater is the tendency for the lighting device to emit a dazzling beam.

The low beam headlights of approaching vehicles may also be dazzling in another situation, in which the rear trunks of these vehicles contain relatively heavy luggage. In this case, the attitude of the vehicle is changed and ceases to be horizontal, the front of the vehicle being raised. Manually or automatically operated correctors are normally provided to lower the light beam to bring it back into conformity with the regulations. If the corrector has not been operated or if it is faulty, the low beam will include light rays located above the upper regulatory limit, these rays causing dazzle and being prohibited by the regulations.

These risks of dazzling by a vehicle approaching in the opposite direction are increased if the vehicle is a heavy goods vehicle, the headlights of which are generally fitted higher up than those of light vehicles.

Various solutions have been proposed to compensate for the daytime dazzling of drivers.

A conventional solution is that of wearing sunglasses to avoid being dazzled by the sun and to enable the details of the road scene in front of the vehicle to be distinguished more clearly.

The drawback of these sunglasses for the driver is that he must remove them whenever the vehicle travels through a shaded area or a tunnel, or when the sun is obscured by dense clouds. This is because the attenuation provided by sunglasses, which is intrinsically constant, has the same effects in the absence of any inconvenience due to the sun, making it harder for the driver to perceive the details of the road scene.

An improvement of these conventional sunglasses has been the provision of photochromic glasses lenses which are sensitive to the ambient light level. These lenses have the property of changing color according to the amount of ultraviolet radiation to which they are subjected. The well-known drawback of these photochromic lenses is that they only return very gradually to their state of greater clarity in the absence of ultraviolet radiation, the time taken for the return to the clear state being much longer than the time taken for coloration.

A further drawback is that, since they only react to the presence of ultraviolet rays, their use for driving motor vehicles generally yields no benefit, as the windshields of most modern vehicles block the transmission of these ultraviolet rays. Photochromic lenses are therefore ineffective for preventing the dazzling of drivers of motor vehicles due to large variations of external brightness.

Other solutions, more complicated than simple sunglasses or photochromic sunglasses, have been proposed. For example, U.S. Pat. No. 3,961,181 discloses a screen for vehicle drivers, which protects both eyes separately but simultaneously from the effect of daytime dazzling due to sunlight and nighttime dazzling due to headlights of approaching vehicles. The screen includes a series of vertical, juxtaposed, contiguous cells which can be controlled electrically, for example liquid crystals, these cells being transparent in the absence of an applied voltage, and darkening as a function of the voltage applied. An array of photosensitive sensors whose electrical resistance increases with brightness is associated with the series of cells. Shields are placed in front of the sensors to create shadows on these sensors. Electrical control means are interposed between the sensors and the cells of the screen to control the transmission factor of the cells as a function of the signals received from the various sensors.

This structure is relatively difficult to create and adjust, the aim being to darken only those cells located between the source of dazzling and the driver's eyes.

Additionally, U.S. Pat. No. 4,848,890 discloses glasses whose lenses are formed by a matrix of liquid crystal cells, and whose frame is provided with a directional photosensitive sensor. Depending on the direction from which the solar rays arrive, cells are switched to an opaque state to prevent the wearer of the glasses from being dazzled by the sun. The major drawback of this arrangement relates to the fact that a large part of the glasses lenses, practically a quarter of the surface of each lens, is darkened, causing a reduction in the field of view that is incompatible with driving a motor vehicle.

EP 0 498 143, which is equivalent to U.S. Pat. No. 5,258,607, also discloses an active anti-dazzle screen for motor vehicle drivers. This screen, which is fixed to the windshield of the vehicle or may take the form of glasses lenses, includes an ambient brightness sensor, while a measurement circuit which also compares the measured value with a threshold value controls the state of transparency of the liquid crystals forming the glasses lenses. The lenses are totally transparent in the absence of a measurement signal. The drawback of this arrangement is that it operates in binary mode, in an on-off way, the lenses being in a state of maximum or minimum transparency depending on whether the brightness is below or above a predetermined threshold.

Other solutions have been tested to compensate for the nighttime dazzling of drivers.

For example, the document FR 2 846 756 discloses a method for improving the night vision of drivers, including a first polarizing filter in the vicinity of the light sources and a second polarizing filter having a polarization direction perpendicular to that of the first filter, in the field of view of the drivers.

This solution is theoretically satisfactory, but in order to be effective it would require all motor vehicles on the road to be fitted with polarizing filters on the protective outer lenses of their lighting devices, and would also require the driver to be provided with polarizing glasses.

Additionally, EP 0 498 143 A1, which is equivalent to U.S. Pat. No. 5,258,607, discloses an anti-dazzle device including an optical sensor supplying a signal proportional to the value of the ambient brightness within a predetermined measurement angle. The sensor transmits this signal to a circuit for measurement and comparison with a predetermined threshold value. If the measured value exceeds the predetermined value, the comparison circuit sends a signal for switching on an electrosensitive screen which is designed to change from a state of total transparency in the absence of a signal to a partially transparent or colored state when the signal is transmitted, and then to return to the transparent state when the signal ceases.

The drawback of this device is that it affects the perception of the whole road scene. If the ambient light level exceeds the authorized threshold, the whole road scene will be obscured, although the excess light level may be created by only one element forming a single point in the road scene. In this case, a driver provided with this anti-dazzle device may fail to see certain important elements in the road scene, such as a traffic sign warning of an imminent hazard, or the road surface illuminated by his own headlight beam.

Document U.S. Patent Publication No. 2009/213282, discloses medical glasses for treating age-related macular degeneration (ARMD) by using adjustable variable-transmission glasses. These glasses include liquid crystals whose transmission changes as a function of the application of an electrical potential, depending on the ambient brightness. The transmission of the liquid crystals depends on the duty cycle of the PWM signal applied to the liquid crystals. This device for medical or therapeutic purposes requires a relatively complicated electronic and data processing infrastructure, and is therefore not applicable to vehicle drivers.

Document WO 92/10130, which is equivalent to U.S. Pat. No. 5,276,536, discloses glasses whose lenses include a film of liquid crystals, which are alternatively transparent or opaque as a function of an electrical field, which is itself a function of the ambient brightness measured by a sensor carried on the glasses frame. This document also discloses that the liquid crystal film is divided into a plurality of cells, each of which can be made alternatively transparent or opaque when it is on the path between a bright light source and the eye of the wearer of the glasses, and the application is to the nighttime driving of motor vehicles.

Documents EP 0 459 433, U.S. Pat. No. 3,961,181 and GB 2 445 365 disclose anti-dazzle devices for the nighttime driving of vehicles, having a camera filming the road scene in front of the vehicle and a liquid crystal screen having pixels whose transparency is controlled as a function of the light sources in the road scene if they are located on the path between the light sources and the driver's eyes.

These last four devices require a large amount of computing power in order to provide acceptable response time and definition. They are therefore very difficult to use and very costly.

What is needed, therefore, is a system, device and method that overcomes one or more of the problems in the prior art.

SUMMARY OF THE INVENTION

The present invention lies within this context, and proposes to provide the driver and passengers of a vehicle with glasses to enable them to avoid being dazzled in daytime by a strongly sunlit road scene, and to avoid being dazzled at nighttime by approaching vehicles whose low beams become dazzling, notably in one of the situations mentioned above.

The present invention lies within this context and has the object of providing assistance to both the driver and the passengers of a vehicle in the observation of the road scene in front of the vehicle, by providing them with glasses for the following purposes:
  in daytime:
  attenuating the brightness of a strongly sunlit road scene, and preventing the dazzling of the driver and passengers, and
  providing a view of the road scene with an attenuation progressively decreasing as a function of the reduction of the brightness of the road scene, to a point of maximum transparency when the brightness of the road scene is low,
  this variation of the attenuation taking place automatically, and
  at night, providing:
  a comprehensive view of the road scene as it is illuminated by the lighting devices of the vehicle, and
  an attenuated view of light sources which are present in the road scene and which do not belong to the vehicle occupied by the driver and passengers, and which might interfere with their perception of the road scene,
  these glasses requiring no complex and costly infrastructure, not hindering the movements of the driver or the passengers, and not restricting their field of view.

For this purpose, the present invention proposes adaptive glasses for motor vehicle drivers or passengers, the glasses comprising lenses having a screen whose coefficient of transmission is variable between a maximum value and a minimum value.

According to the invention, the coefficient of transmission of the glasses lenses is controlled according to a wireless communication protocol.

According to other characteristics of the invention, considered separately or in combination:
- the coefficient of transmission of the glasses lenses is controlled by a control unit;
- the coefficient of transmission of the glasses lenses is controlled by radio, infrared or ultrasonic waves;
- the control unit is controlled by a sensor which measures the brightness of the road scene in front of the vehicle;
- the brightness of the road scene in front of the vehicle is measured by a sensor located on the inner face of a windshield fitted to the vehicle;
- the coefficient of transmission of the glasses lenses is controlled by a control unit receiving the signals from the sensor for measuring the brightness of the road scene in front of the vehicle, and the signals from a sensor for measuring the amount of light transmitted by the glasses lenses;
- the sensor of the amount of light transmitted by the glasses lenses measures the amount of light reflected by the cornea of the driver's eye;
- the coefficient of transmission of the glasses lenses is varied by the control unit, which controls in synchronization the variation of intensity of the light beam emitted by at least one headlight fitted to the vehicle;
- the control unit receives the signals from a sensor for measuring the amount of light transmitted by the glasses lenses;
- the sensor of the amount of light transmitted by the glasses lenses measures the amount of light reflected by the cornea of the driver's eye;
- the coefficient of transmission of the glasses lenses is controlled in synchronization with luminous visual displays presented by the vehicle dashboard and relating to the operation or the environment of the vehicle;
- the coefficient of transmission of the glasses lenses is controlled in synchronization with the interior lighting of the vehicle, the interior lighting being switched on only when the coefficient of transmission of the variable-transmission screen is at its minimum value;
- the glasses have their own electrical power supply;
- the glasses have a liquid crystal screen or a microelectromechanical system;
- the coefficient of transmission is variable according to a pulse width modulation (PWM) mode.

BRIEF DESCRIPTION OF THE ACCOMPANYING DRAWINGS

Other objects, characteristics and advantages of the present invention will be apparent from the following description of an exemplary embodiment, provided on a non-limiting basis with reference to the attached drawings, in which:

FIGS. 6A and 6B show a road scene as observed by the driver of the vehicle shown in FIG. 1; FIG. 6A shows the scene without the device according to the present invention, while in FIG. 6B the vehicle is fitted with the device according to the present invention;

FIGS. 8A to 8C show diagrams of the temporal variation in the nighttime driving configuration, FIG. 8A shows the electrical power supplied to the light sources of the headlights of the vehicle of FIG. 1, while FIG. 8B shows the luminous intensity emitted by these headlights, and FIG. 8C shows the temporal variation of the coefficient of transmission of a variable-transmission screen.

DETAILED DESCRIPTION OF THE PREFERRED EMBODIMENTS

Figure 1:
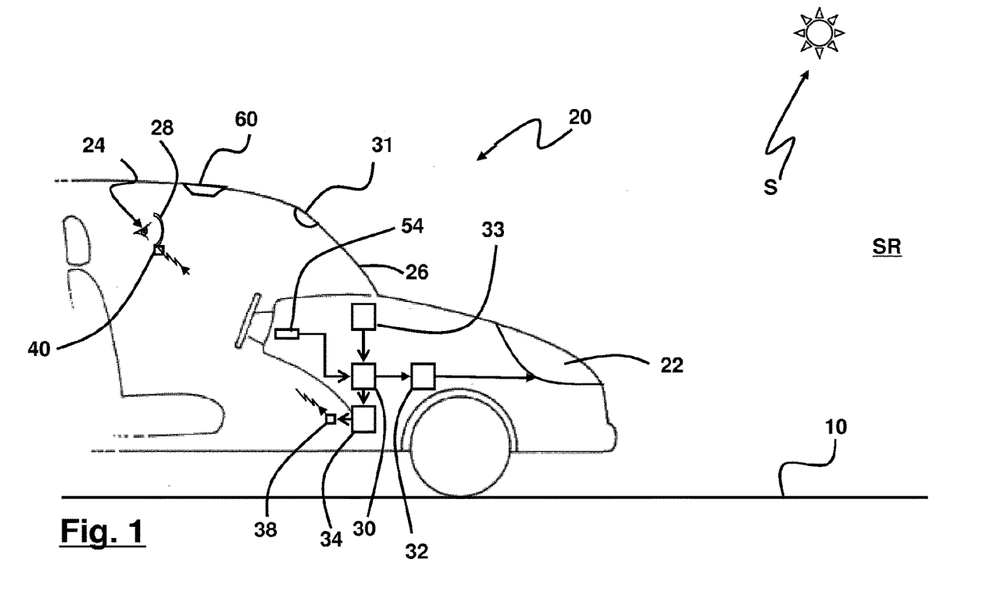
FIG. 1 shows schematically, in partial section, a vehicle in which the glasses according to the present invention are used.

FIG. 1 shows a partial section through a vehicle indicated as a whole by the reference 20, traveling on a road 10 and controlled by a driver 24, indicated symbolically by his eye.

In the remainder of the present description, reference will be made solely to the driver of the vehicle 20. However, the present invention is equally applicable to the passengers in this vehicle. Unless expressly stated, the term "driver" is therefore to be understood as additionally signifying the passenger or passengers in the vehicle.

As mentioned above, the driver 24 may be dazzled by elements of the road scene SR in front of the vehicle,
- either in daytime, in very sunny weather,
- or at night, by the headlights of vehicles traveling in the opposite direction.

These conditions are described below.

Daytime Traveling Conditions

As shown in FIG. 1, in sunny weather, notably at the end of the day when the sun S is low on the horizon, the road scene SR in front of the vehicle 20 is strongly illuminated, and the driver 24 may not only be dazzled, but may also fail to distinguish details of this road scene SR that are important for his safety, for example traffic signs warning of the proximity of a hazard, or the state of the roadway on which he is traveling.

The invention therefore proposes to provide the driver 24 with a pair of adaptive glasses 28 to modulate the amount of light reaching the driver's eye 24. Only one glasses lens 28 has been shown, for the sake of clarity.

The glasses lenses 28 are designed to have a very short response time and to allow a fast variation of their coefficient of transmission. The liquid crystals make it possible to produce screens of this type with a variable coefficient of transmission with a very fast reaction time of the order of a millisecond. These response times can also be achieved using microelectromechanical systems, such as the type described in U.S. Pat. No. 7,684,105.

Advantageously, the glasses 28 have their own electrical power supply (not shown) in the form of a button cell or rechargeable miniature battery, like those of glasses used for watching three-dimensional animated images.

In fact, the control of the state of transparency, or of the coefficient of transmission, of a liquid crystal screen or a microelectromechanical system requires only minimal electrical power, so that miniature batteries such as button cells are amply sufficient to provide correct operation of glasses lenses 28 using liquid crystals or microelectromechanical systems for a considerable length of time.

For controlling the coefficient of transmission of the glasses lenses 28, the invention provides for the use of a photosensitive sensor 31 for measuring the brightness of the road scene SR in front of the vehicle 20.

Advantageously, the photosensitive sensor 31 is located on the inner face of the windshield 26 of the vehicle 20, at the level of the interior rear view mirror (not shown), that is to say in the middle of the upper part of the windshield 26. This position makes it possible to collect information particularly representative of the brightness outside the vehicle 20, originating from the road scene SR. Also advantageously, the measurement signals of the photosensitive sensor 31 may also be used to cause the low beam headlights to be switched on when the brightness of the road scene SR falls below a predetermined threshold, as in most modern vehicles.

Figure 2:
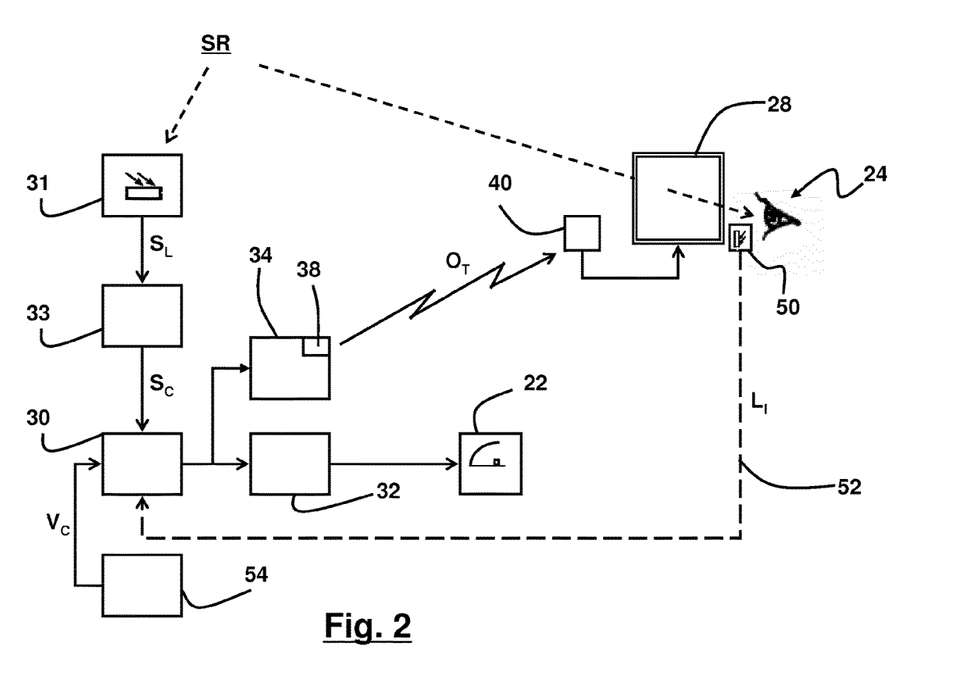
FIG. 2 shows schematically a diagram of the operation of the device according to the present invention.

As is shown in greater detail in FIG. 2, the output signal SL of this photosensitive sensor 31 is received and processed by a circuit 33 adapted to convert this output signal SL into a signal SC for controlling the coefficient of transmission of the glasses lenses 28, this signal SC in turn being received by a control unit 30 for controlling the coefficient of transmission of the variable-transmission glasses lenses 28.

The control unit 30 controls a circuit 34 for controlling the coefficient of transmission of the glasses lenses 28, which itself comprises a transmitter 38, for transmitting radio, infrared or ultrasonic waves for example, according to a wireless communication protocol, for example according to Bluetooth or Wi-Fi (registered trademarks) standards.

These waves are referred to in the rest of the description as "remote control waves" OT. The glasses 28 are provided with a receiver 40 of these remote control waves OT.

According to the present invention, the modulation of the coefficient of transmission of the glasses lenses 28 takes place in real time, as a function the brightness of the road scene SR measured by the photosensitive sensor 31.

For this purpose, in response to the output signal SL of the photosensitive sensor 31, representing the brightness of the road scene SR in front of the vehicle 20, the circuit 33 generates a control signal SC which is a function of the signal SL. The control signal SC is then transmitted by the transmitter 38 of the control circuit 34, via the waves OT and the receiver 40, to the glasses lenses 28.

The coefficient of transmission of the glasses lenses 28 is thus modulated as a function of the received signal SC, that is to say as a function of the brightness measured by the sensor 31, according to a well-known principle.

Thus, as the brightness measured by the sensor 31 increases, the signal SL becomes stronger and the coefficient of transmission of the glasses lenses 28 becomes smaller, or, in other words, the glasses lenses 28 become less transmissive.

If the vehicle 20 moves from a strongly sunlit area to a shaded area, for example a tunnel, the brightness of the road scene SR falls abruptly. The value of the signal SL varies equally abruptly, as does the value of the signal SC. This variation is transmitted by the waves OT to the glasses lenses 28 whose coefficient of transmission increases abruptly, thus allowing the driver 24 to immediate have a clear view of this new, darker environment.

The glasses lenses 28 become clear well before the pupils of the driver's eyes 24 dilate to adapt to the sudden darkness. The advantages of the glasses 28 according to the invention are thus enhanced by the fact that, since the glasses lenses 28 have become clearer, the variation in the amount of light reaching the driver's eye 24 has a lower amplitude than if the driver were not wearing any glasses 28, and the pupil, which has to dilate to a smaller degree, reaches its new aperture more quickly.

The same phenomenon is repeated in the opposite direction at the exit from the tunnel, the glasses lenses 28 returning virtually instantaneously to their lower transparency, and providing the driver much more quickly with an attenuated view of the sunlit road scene SR.

Thus, according to the invention, a pair of glasses 28 has been provided, having lenses with variable transmission and with a coefficient of transmission that is adjusted in real time as a function of the brightness of the road scene SR observed by the driver 24: as the brightness increases, the glasses lenses 28 become darker, and vice versa.

The driver 24 of the vehicle 20 traveling in an environment in which the brightness is highly variable can thus observe the road scene SR in front of his vehicle through the glasses 28 described above, these glasses 28:

attenuating the brightness of a strongly sunlit road scene SR, and preventing the dazzling of the driver 24, providing a view of the road scene SR with an attenuation progressively decreasing as a function of the reduction of the brightness of the road scene SR, to a point of maximum transparency when the brightness of the road scene SR is low, the variation of the attenuation taking place automatically, the glasses 28 causing no inconvenience, because they are not attached to any wire connection, the coefficient of transmission CT of the glasses lenses 28 being controlled according to a wireless communication protocol.

In order to find the coefficient of transmission which exactly yields the desired darkening, a feedback loop may be included in the control of this coefficient, as shown in FIG. 2.

In this loop, an ocular sensor 50 measures the amount of light reflected by the cornea of the driver's eye 24. The sensor 50 is, for example, incorporated into the frame of the glasses 28 worn by the driver 24.

It is assumed that the light received by the driver's eye 24 has already passed through the glasses lenses 28. The measurement by the sensor 50 of the amount of light reflected by the cornea of the driver's eye 24 provides a measurement of the amount of light reaching this driver's eye 24, after preliminary calibration or graduation if necessary, and therefore provides an indirect measurement of the amount of light transmitted through glasses lenses 28.

This measurement LI of light transmitted through the glasses lenses 28 and striking the driver's eye 24 is transmitted by a link 52 to the control unit 30. The link 52, shown in broken lines, can advantageously be formed by a wireless link, for example by using radio, infrared or ultrasonic waves according to a wireless communication protocol, for example according to Bluetooth or Wi-Fi (registered trademarks) standards.

Consequently the control unit 30 can simultaneously access:

the direct measurement of the brightness of the road scene SR, provided by the sensor 31, and the brightness of the road scene SR after attenuation by the glasses lenses 28, provided by the sensor 50.

The control unit 30 contains a comparator which compares the measured value $L_I$ of the light striking the eye 24, after its passage through the glasses lenses 28, with a set point value $V_C$, contained in a memory 54. As a function of the difference between the set point value $V_C$ and the measured value $L_I$, and as a function of the signal $S_C$, which is itself a function of the value of the brightness outside the vehicle 20, the control unit 30 constantly adjusts the control signal transmitted by the waves $O_T$ to make the measured value $L_I$ equal to the set point value $V_C$.

This set point value $V_C$ may be fixed in the memory 54, or, preferably, may be adjustable, for example by being regulated by the driver 24 via the dashboard of the vehicle 20, as shown in FIG. 1.

Thus the driver 24 can set the degree of darkening of the glasses lenses 28 to any desired value in order to observe the road scene SR in front of his vehicle 20 in the best possible conditions, the amount of light reaching his driver's eye 24 remaining constant and equal to a predetermined value, as assigned by the driver 24 to the memory 54.

Figure 3:
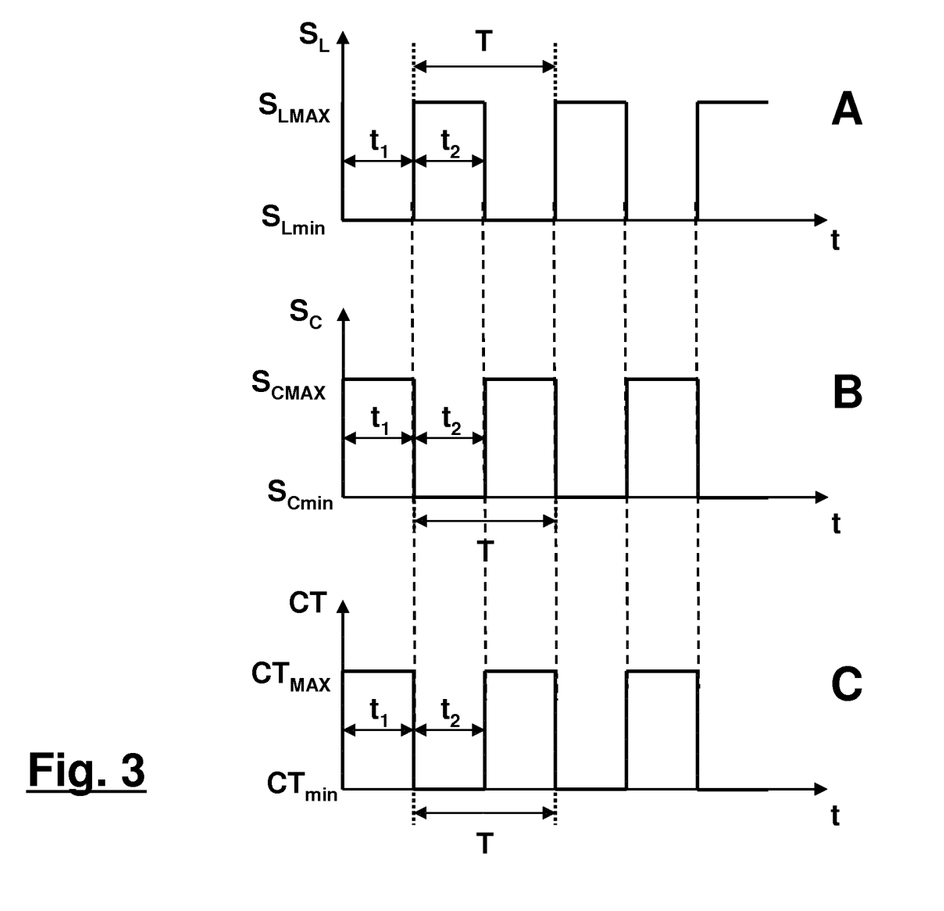
FIGS. 3A to 3C show diagrams of the temporal variation of the various signals used in the circuits of the present invention in the daytime driving configuration.

According to a preferred embodiment of the invention, the transmission of the signals could be made to take place not in a continuous, analog way as described above, but rather in a digital way, that is to say in an alternating way, preferably in PWM (standing for the English expression "pulse width modulation") mode, at a predetermined frequency, according to the diagrams of FIG. 3.

According to this preferred embodiment, the photosensitive sensor 31 sends an analog signal whose value is a function of the luminous intensity that it receives from the road scene SR in front of the vehicle 20. The sensor 31 is associated with a circuit that converts this analog signal into a PWM coded digital signal $S_L$.

As shown in FIG. 3A, this signal $S_L$ varies between a value of $S_{Lmin}$ for a duration (t1) and a value of $S_{LMAX}$ for a duration $t_2$, the sum of the durations $t_1$ and $t_2$ defining the period T of the alternating signal $S_L$, which is further characterized by a duty cycle β.

It should be noted that the duty cycle β of the signal $S_L$ is determined by the ratio between the duration $t_2$ for which the signal is at a maximum and the duration T of the period, and thus varies from 0 to 100%:

$$\beta = \frac{t_2}{T}$$

The duty cycle β of the signal $S_L$ thus appears as a direct function of the luminous intensity received by the sensor 31

This signal $S_L$ is received by the circuit 33, which converts it into a control signal $S_C$ shown in FIG. 3B.

The signal $S_C$ varies between a maximum value $S_{CMAX}$ for the duration $t_1$ and a minimum value $S_{Cmin}$ for the duration $t_2$, with the same period $T=t_1+t_2$ as the signal $S_L$ and with a duty cycle α such that $$\alpha = \frac{t_1}{T} = 1 - \beta$$

To summarize, in response to the signal $S_L$ supplied by the photosensitive sensor 31, which is a function of the value of the brightness of the road scene SR in front of the vehicle 20, the circuit 33 generates an alternating signal $S_C$ in pulse width modulation (PWM), at a predetermined frequency $$v = \frac{1}{T}$$

and with a duty cycle α, according to the diagram of FIG. 3B, showing the brightness of the road scene SR in front of the vehicle 20 as measured by the sensor 31.

This signal $S_C$ is transmitted via the control circuit 34 by the remote control waves $O_T$ to the receiver 40, which then controls the coefficient of transmission of the glasses lenses 28, if necessary allowing for the corrections made by the signals $L_I$ and $V_C$.

As shown in FIG. 3C, this coefficient of transmission varies, in response to the signal $S_C$, between a value of $CT_{MAX}$ for the duration $t_1$ and a value of $CT_{min}$ for the duration $t_2$, with the same duty cycle α as the signal $S_C$ and the same frequency ν.

The value $CT_{MAX}$ is the value for which the glasses lenses 28 have their maximum transparency. In most cases, liquid crystal screens have this state in the absence of any electrical excitation, in other words in the rest state, and are opaque only under the effect of an electric field. In these cases, the value $CT_{MAX}$ corresponds to a minimum excitation of the liquid crystals forming the glasses lenses 28.

In some cases, the rest state of a liquid crystal screen or a screen with a microelectromechanical system may be that in which it has maximum opacity, becoming transparent only under the effect of an electric field. In this eventuality, the value $CT_{MAX}$ corresponds to a maximum excitation of the liquid crystals or of the microelectromechanical system screens forming the glasses lenses 28.

The above explanations are applicable, mutatis mutandis, to the value $CT_{min}$ of the coefficient of transmission of the glasses lenses 28.

Thus the diagram of FIG. 3C shows the variation of the coefficient of transmission CT of the glasses lenses 28, rather than the variation of the excitation signal of these glasses lenses 28.

The driver 24 can therefore observe the road scene SR through glasses lenses 28, whose coefficient of transmission is adjusted in real time as a function of the brightness of the road scene SR: as the road scene SR becomes brighter, the variable-transmission glasses lenses 28 increasingly attenuate the light reaching the driver 24.

The automatic adjustment of the coefficient of transmission of the spectacle lenses 28 is achieved by a sequence of states of maximum and minimum transparency of these glasses lenses 28, at a frequency ν and with a duty cycle α. The frequency ν is chosen to be high enough to prevent any scintillation phenomenon for the driver 24 of the vehicle 20. The frequency ν will be, for example, greater than 100 Hz, to benefit fully from the phenomenon of persistence of vision.

As in the case of the embodiment with analog operation, a feedback loop can be provided. In this case, the photosensitive sensor 50 sends an analog signal whose value is a function of the luminous intensity that it receives from the cornea of the driver's eye 24. The sensor 50 is associated with a circuit that converts this analog signal into a PWM coded digital signal $L_I$.

In this embodiment, the control unit 30 receives:
the signal of the direct measurement of the brightness of the road scene SR, provided by the sensor 31, and the signal of the measurement of the brightness of the road scene SR after attenuation by the glasses lenses 28, provided by the sensor 50;

these two signals being PWM coded in the same way as the signal representing the set point value $V_C$.

As in the embodiment with analog operation, the comparator of the control unit 30 may use these signals to constantly adjust the control signal transmitted by the waves $O_T$ to make the measured value $L_I$ equal to the set point value $V_C$.

Nighttime Traveling Conditions

Other events may interfere with the driver's 24 view of the road scene SR, notably in nighttime driving, these interfering elements taking the form, notably, of the headlights of vehicles traveling in the opposite direction.

Figure 4:
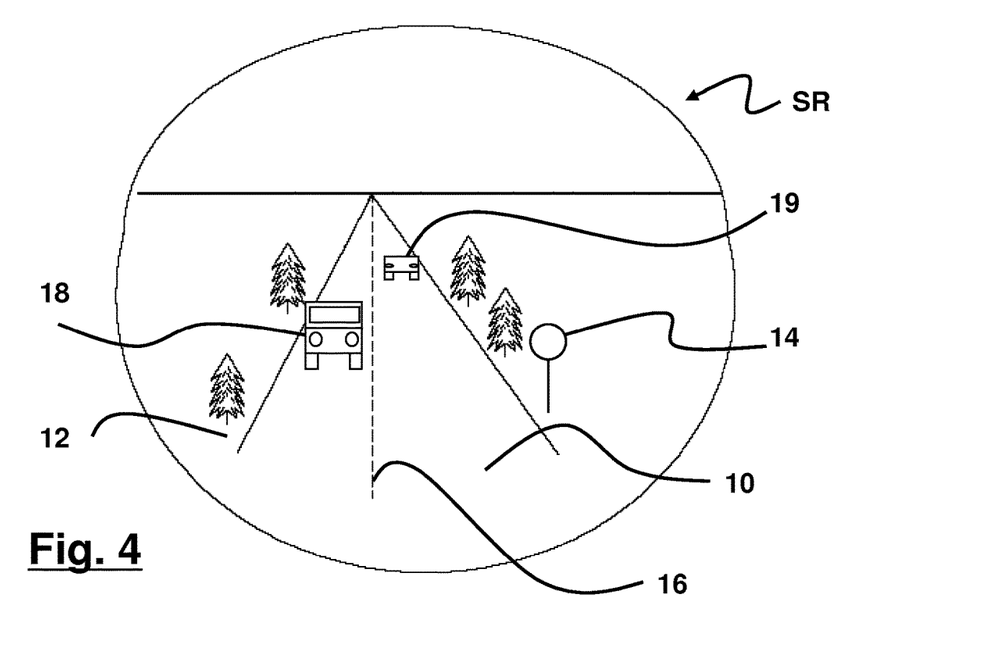
FIG. 4 shows schematically a road scene as it may be observed by the driver or passengers of a vehicle.
Figure 6:
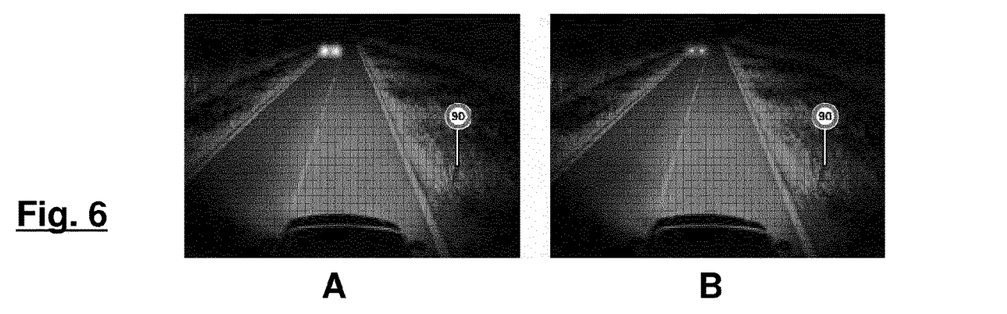

With reference to FIG. 4 initially, a road scene SR is shown schematically as it may be perceived by a driver 24 or his passengers in a regular nighttime driving situation. FIGS. 6A and 6B show views of this road scene SR, in nighttime driving, after the low beam headlights have been switched on.

The road scene SR typically includes, in addition to the road 10 itself, roadside elements such as structures or, as in the example shown, road shoulders and trees, traffic signs and other vehicles, followed or approaching.

The elements visible in a road scene SR illuminated by the low beam headlights of a vehicle can be classified into several categories:

passive elements or passive sources, such as elements of the landscape, for example the road 10, the shoulders and trees 12, adjacent structures, and the like, that is to say the elements that receive the light emitted by the headlights of the vehicle 20, and that diffuse in all directions equally, or, in other words, that have only an induced brightness, in that the more they are illuminated, the brighter they are;

semi-active elements or semi-active sources, such as traffic signs 14, fluorescent marking lines 16 on the roadway, reflectors of other vehicles that are followed (traveling in the same direction) 19, and the like, that is to say elements that receive the light emitted by the headlights of the vehicle and that reflect a notable part of this light in a preferred direction, generally approximately in the direction from which it came; in other words, these elements also have only an induced brightness, but this brightness is greater than that of the passive elements, active elements or active sources, such as the lighting devices 18 of other approaching vehicles (those moving in the opposite direction), three-color traffic signal lights, street lights, and the like, that is to say elements that are light sources themselves and that emit light by themselves, independently of the illumination that they receive; in other words, these elements have an intrinsic brightness, regardless of the illumination that they receive.

Thus all the elements of the road scene SR are perceived by a driver 24 with a brightness that is the sum of:

their intrinsic brightness, which is zero for passive and semi-active elements, and their induced brightness, which is negligible for active elements.

Thus, in the road scene of FIG. 4, the following can be seen:

passive sources such as the road 10, the shoulders and the trees 12, semi-active sources such as the traffic sign 14, the marking lines 16 on the roadway and the reflectors 19 of followed vehicles, and active sources such as the headlights 18 of a vehicle traveling in the opposite direction.

As a general rule, passive and semi-actives do not give rise to unacceptable problems of dazzling, since traffic signs with a large surface area which might create this kind of inconvenience are generally located away from the immediate proximity of the road.

Therefore, the problems of dazzling arise solely from active elements such as the headlights 18 of vehicles traveling in the opposite direction, for the various reasons explained in the introduction above.

The adaptive glasses 28 according to the present invention also provide a solution to this problem, by reducing the brightness of the active elements which are potential sources of dazzle, but without changing the brightness of the passive or semi-active elements which may be important for safety. For this purpose, the invention proposes that the glasses 28 worn by the driver and passengers will:

on the one hand, filter the potentially dazzling light rays from active sources, and on the other hand, be transparent to light rays from passive and semi-active sources, so as not to occult the safety information contained by them.

According to the present invention, the headlights 22 emit a light beam of variable intensity, the variation of the intensity of the low beam emitted by the headlights 22 being synchronized with the variation of the coefficient of transmission of the glasses lenses 28.

In other words, the maximum levels of luminous intensity emitted by the headlights 22 coincide with the maximum levels of the coefficient of transmission of the glasses lenses 28, and the minimum levels of light intensity emitted by the headlights 22 coincide with the minimum levels of the coefficient of transmission of the glasses lenses 28.

Thus the driver's 24 perception of the road scene SR through the glasses 28 is optimal when the road scene SR is illuminated with the maximum light intensity. In order to achieve this object, the invention proposes that the control unit 30 should control:

a regulating circuit or driver 32 for supplying the light sources of the headlights 22, and the circuit 34, including the transmitter 38, for controlling the coefficient of transmission of the glasses lenses 28.

The operation of the control unit 30 is triggered automatically when the measurement signal from the sensor 31 corresponds to that of a brightness of the road scene SR which is below a predetermined threshold, and therefore causes the low beam headlights to be switched on. The operation of the control unit 30 may also be triggered manually, when the driver 24 of the vehicle 20 himself switches on the low beam headlights at the dashboard.

The control unit thus operates as follows:

either in "day" mode, when the headlights 22 are switched off, by controlling the circuit 34 for controlling the coefficient of transmission of the glasses lenses 28, according to the preceding description, or in "night" mode, when the headlights 22 are switched on, manually or automatically, to emit a low beam, by controlling simultaneously:

the circuit 34 for controlling the coefficient of transmission of the glasses lenses 28, and the circuit 32 for regulating the power supply to the light sources of the headlights 22, according to the description which will now be provided.

In "night" mode, the control provided by the control unit 30 is such that:
- the regulating circuit 32 causes the light sources of the headlights 22 to be supplied in such a way that the headlights 22 emit a light beam having a periodically variable intensity, between a maximum value and a minimum value, and
- the circuit 34 controls the coefficient of transmission of the glasses lenses 28, so that these lenses 28 change periodically from a maximum transparency to a minimum transparency, and
- the circuits 32 and 34 are controlled in a synchronized manner, the intensity emitted by the headlights 22 being maximal at the time when the transparency of the glasses lenses 28 is maximal, and vice versa, the intensity emitted by the headlights 22 being minimal at the time when the transparency of the glasses lenses 28 is minimal.

Since the illumination provided by the headlights 22 is variable, the light sources fitted to these headlights 22 should not have an excessive inertia; in other words, the emitted luminous power should be a direct function of the electrical power received by them. Incandescent lamps, as well as discharge lamps, can only meet this condition with a response time which is unsuitable for resolving the problem of the present invention, and therefore the invention provides for the use of semiconductor sources for the light sources of the headlights 22.

These sources may take the form of light-emitting diodes, or "LEDs", which emit white light, such as those fitted to modern vehicles. They may also take the form of laser diodes, in which the ray strikes a phosphor layer which in turn emits white light.

The reaction of these diodes, in terms of light emission, to any variation in their power supply is virtually instantaneous, so that they allow precise control of the illumination of the road scene in front of the vehicle, and this illumination can therefore be made periodically variable at a relatively high frequency.

Similarly, the glasses lenses 28, of the liquid crystal or microelectromechanical system type, provide a very short response time and a fast variation of their coefficient of transmission.

As described above,
- the glasses 28 have their own electrical power supply (not shown) in the form of a button cell or rechargeable miniature battery, like those of glasses used for watching three-dimensional animated images, and
- the coefficient of transmission of the glasses lenses 28 is controlled in a wireless manner by means of remote control waves, via the transmitter 38 and the receiver 40.

Figure 5:
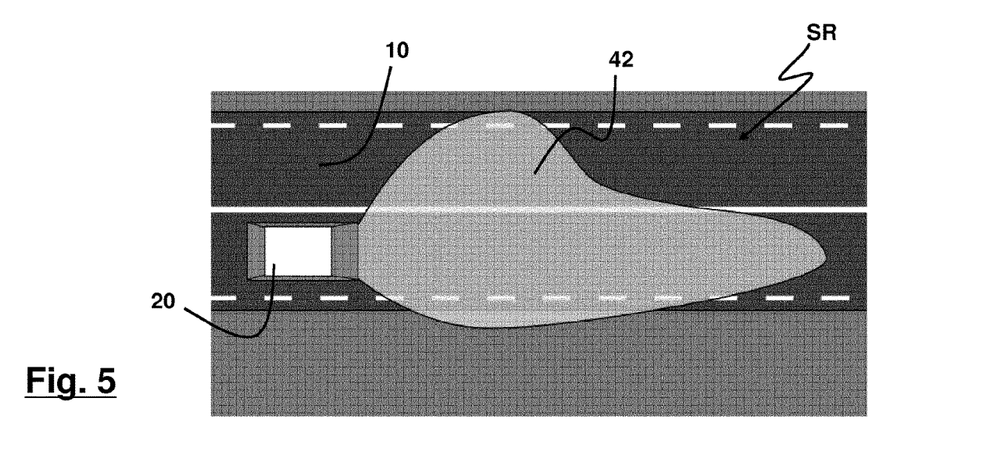
FIG. 5 shows schematically, in a view from above, a low beam according to regulations emitted by a vehicle.
Figure 8:
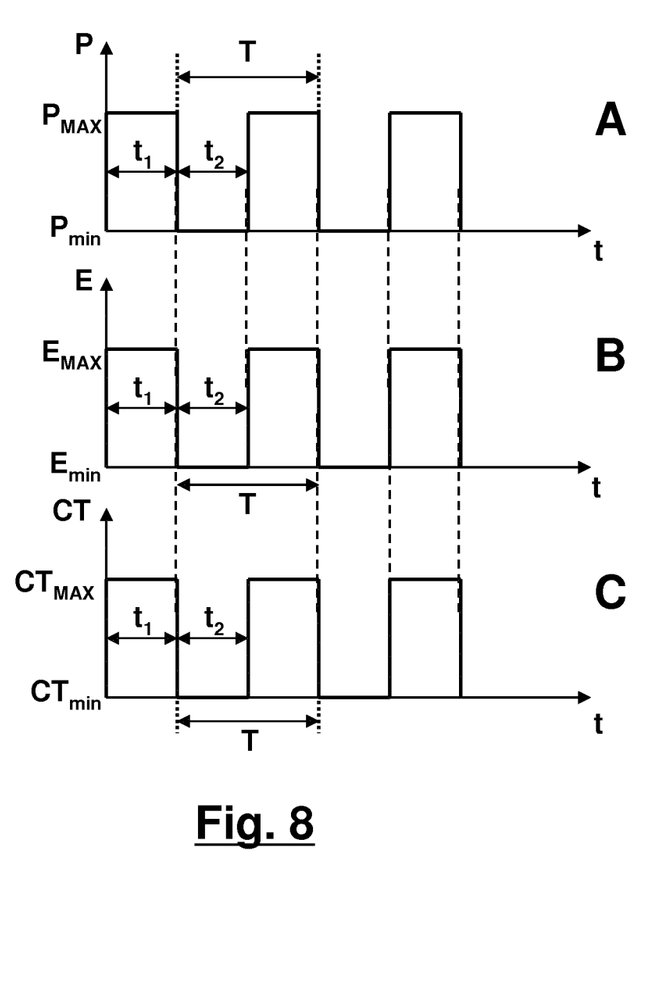

If, as a result of a reduction in the ambient brightness, the light sources of the headlights 22 are switched on, manually by the driver 24 or automatically by an ambient brightness sensor, in order to emit a low light beam, that is to say a beam 42 as shown in FIG. 5 in a view from above, the control unit 30 controls the regulating circuit 32 so that the light sources of the headlights 22 are supplied periodically, according to the diagram in FIG. 8A.

The light sources of the headlights 22 therefore receive an electrical power P variable periodically between a maximum value $P_{MAX}$ for a duration of $t_1$ and a minimum value $P_{min}$ for a duration of $t_2$, for example in PWM (standing for the English expression "Pulse Width Modulation") mode, at a predetermined frequency and with a duty cycle of $$\alpha = \frac{t_1}{T}$$

The LED or laser diodes fitted to the headlights 22 react practically instantaneously to a variation in the electrical power supplied to them, and therefore emit an illumination E varying periodically between a maximum illumination $E_{MAX}$ for a duration of $t_1$ and a minimum illumination $E_{min}$ for a duration of $t_2$, at the same frequency and with the same predetermined duty cycle α, as shown in the diagram of FIG. 8B.

No allowance is made in FIG. 8B for the response time of the light sources, which may be considered negligible. If it were desirable for these response times of the light sources to be shown in FIG. 8B, this would mean that the "switchover" of the illumination E from one state to the other would show a delay with respect to the power P supplied to these light sources, shown in FIG. 8A.

It should be noted that the duty cycle α is determined by the ratio between the duration $t_1$ for which the electrical power is maximal and the duration T of the period, and therefore varies from 0 to 100%:

$$\alpha = \frac{t_1}{T}$$

A diode of the LED or laser type reacts practically instantaneously to a variation in the electrical power supplied to it. Consequently, the illumination emitted by the light sources of the headlights 22 substantially varies with the same duty cycle α.

If the minimum value $P_{min}$ of the power supplied to the light sources is zero, the minimum illumination $E_{min}$ is also equal to zero. In these conditions, the mean illumination $\overline{E}$ emitted by the light sources supplied in PWM mode with a duty cycle α is equal to:

$$\overline{E} = \alpha \cdot E_{MAX}$$

To ensure that the illumination of the road scene conforms to the regulations, therefore, it is simply necessary for the mean illumination provided by the light sources supplied in PWM mode to be equal to the illumination $E_{REG}$ that they would have to emit in continuous conditions to provide this illumination according to the regulations, i.e.:

$$E_{MAX} = \frac{1}{\alpha} \cdot E_{REG}$$

Given the characteristics of the LED or laser diodes used, it is easy to deduce from these the electrical power $P_{REG}$ required to supply the diodes so that they provide the desired illumination $E_{MAX}$ for the time $t_1$ at the frequency $$\nu = \frac{1}{T}.$$

This frequency ν is chosen to be high enough to prevent any scintillation phenomenon, both for the driver of the vehicle 20 and for the drivers of other vehicles which are approaching or being followed. The frequency ν will be, for example, greater than 100 Hz, to benefit fully from the phenomenon of persistence of vision.

Thus the illumination of the road scene SR by the headlights 22 will be perceived, by the driver 24 of the vehicle 20 and by the other drivers, as though it were conventional continuous illumination.

However, according to the invention, the driver 24 of the vehicle 20 observes this road scene SR through the glasses 28, whose coefficient of transmission variable with the same frequency as that of the operation of the headlights 22 and the same duty cycle, as shown by the diagram of FIG. 8C.

The glasses 28 thus have a coefficient of transmission CT which varies between:
a maximum value $CT_{MAX}$, for which the transparency of the lenses is maximal during the time $t_1$, and
a minimum value $CT_{min}$, for which the transparency of the lenses 28 is minimal during the time $t_2$,
as shown in FIG. 8C.

Figure 9:
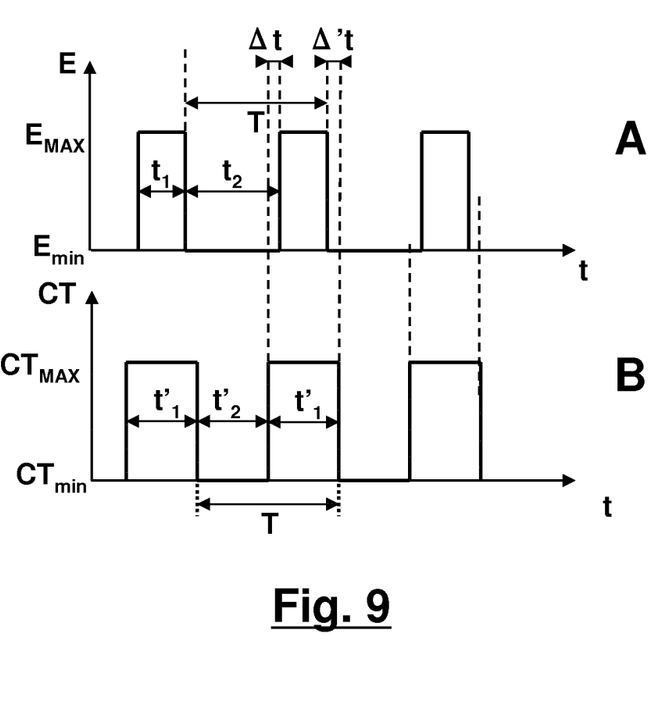
FIGS. 9A and 9B show variants of FIGS. 8B and 8C respectively, FIG. 9A being a diagram of the temporal variation of the luminous intensity emitted by the headlights, and FIG. 9B being a diagram of the temporal variation of the coefficient of transmission of a variable-transmission screen.

Preferably, as shown in FIG. 9, the duration $t'_1$ for which the coefficient of transmission has its maximum value $CT_{MAX}$ is greater than the duration $t_1$ for which the illumination has its maximum value $E_{MAX}$, so that it starts an instant $\Delta t$ before $t_1$ and ends an instant $\Delta' t$ after $t_1$. Using this variant embodiment, it is possible to ensure that:
when the light source 22 switches to its maximum illumination state $E_{MAX}$, the coefficient of transmission CT already has its maximum value $CT_{MAX}$, and that
when the coefficient of transmission CT switches to its minimum value $CT_{min}$, the light source 22 has already switched to its minimum illumination state $E_{min}$.

However, it is possible to arrange matters so that the offset $\Delta t$ between the illumination E and the coefficient of transmission CT is in the other direction, that is to say that:
when the coefficient of transmission CT switches to its maximum value $CT_{MAX}$, the light source 22 is already in its maximum illumination state $E_{MAX}$, and that
when the light source 22 switches to its minimum illumination state $E_{min}$, the coefficient of transmission CT has already switched to its minimum value $CT_{min}$.

The value of the offset $\Delta t$ or $\Delta' t$ is small relative to the durations $t_1$ or $t_2$, regardless of whether this offset $\Delta t$ or $\Delta' t$ is located before the start of $t_1$ or of $t_2$, or before the end of $t_1$ or of $t_2$. In all the examples considered, it may therefore be said that the illumination (E) reaches its maximum value ($E_{MAX}$) substantially when the coefficient of transmission (CT) of the screen (26, F, 28) reaches its maximum value ($CT_{MAX}$).

In other words, the first variant described above (CT becomes equal to $CT_{MAX}$ when the source 22 has already reached $E_{MAX}$, and the source 22 switches to $E_{min}$ when CT is already equal to $CT_{min}$) makes it possible to ensure that the coefficient of transmission will have its maximum value $CT_{MAX}$ for the whole of the duration for which the light source is in its maximum illumination state $E_{MAX}$, and therefore that the driver will have an optimal view of the road scene as it is illuminated by the light source 22.

As has been stated with respect to daytime driving conditions, the value $CT_{MAX}$ is the value for which the glasses lenses 28 have their maximum transparency. In most cases, screens of the liquid crystal or microelectromechanical system type have this state in the absence of any electrical excitation, in other words in the rest state, and are opaque only under the effect of an electric field. In these cases, the value $CT_{MAX}$ corresponds to a minimum excitation of the liquid crystals or the microelectromechanical systems forming the glasses lenses 28.

In some cases, the rest state of a screen of the liquid crystal screen or microelectromechanical system type may be that in which it has maximum opacity, becoming transparent only under the effect of an electric field. In this eventuality, the value $CT_{MAX}$ corresponds to a maximum excitation of the liquid crystals or of the microelectromechanical system forming the glasses lenses 28.

In the same way as for daytime driving conditions, the above explanations are applicable, mutatis mutandis, to the value $CT_{min}$ of the coefficient of transmission of the glasses lenses 28.

Thus the diagram of FIG. 3C shows the variation of the coefficient of transmission CT of the glasses lenses 28, rather than the variation of the excitation signal of these glasses lenses.

Preferably, the minimum value $CT_{min}$ of the coefficient of transmission CT is substantially zero during the time $t_2$, or, in other words, the variable-transmission screen is substantially opaque during the time $t_2$.

In these conditions:
the glasses 28 are opaque during the time $t_2$, that is to say while the light sources of the headlights 22 are switched off, and
the transparency of the glasses 28 is maximal during the time $t_1$, that is to say while the light sources of the headlights 22 are illuminating the road scene SR with the maximum intensity.

The driver 24 therefore has the impression of seeing the road scene SR as if it were illuminated by conventional headlights providing continuous illumination.

However, owing to the glasses of the present invention, and as shown in FIG. 4, the driver 24 sees, during the time $t_1$ when the glasses 28 have their maximum transparency:
all the passive elements illuminated by the low beam 42 in the road scene, such as the road 10 and the shoulders 12,
all the semi-active elements in this beam 42 which receive the light from the headlights 22 and back-reflect it toward the vehicle 20 and the driver 24, such as the traffic signs 14 and the reflectors 19 of the followed vehicles, and
all the active elements, such as the headlights 18 of approaching vehicles.

During the time $t_2$, the glasses are opaque, and the driver 24 therefore sees nothing of the road scene SR.

Since the times $t_1$ and $t_2$ follow each other at the frequency $\nu$ of more than about 100 Hz, the driver's eye 24 performs an integration of his observations, in the course of which the passive elements are illuminated periodically during the times $t_1$,
at the frequency $\nu$,
with a duty cycle $\alpha$,
with an illumination $$E_{MAX} = \frac{1}{\alpha} \cdot E_{REG}.$$

The mean of the successive observations of the passive elements is therefore equal to the observation which would be made with a constant illumination $E_{REG}$. Therefore the driver 24 has a view of the passive elements which is no different from that provided by conventional illumination.

The semi-active elements are illuminated in the same conditions as the passive elements, and they reflect a considerable part of the light they receive approximately in the direction from which it comes. For example, if the duty cycle α is equal to 50%, they will receive a quantity of light $O_2$ twice as great as the quantity according to the regulations $Q_{REG}$, during a time that is half as long. They will therefore reflect as much light as if they had been continuously illuminated with the quantity according to the regulations $Q_{REG}$.

The mean of the successive observations of the semi-active elements is therefore equal to the observation which would be made with constant illumination $E_{REG}$. Therefore the driver 24 has a view of the semi-active elements which is no different from that provided by conventional illumination.

The active elements receive a quantity of light which is entirely negligible relative to the quantity emitted by them. However, they can only be observed by the driver 24 during the time $t_1$, during which the glasses lenses 28 provide their maximum transmission.

Therefore the active elements are visible only during a fraction of time equal to the duty cycle α. Their apparent brightness through the variable-transmission screen is therefore decreased relative to their actual brightness by a factor α.

The desired result is therefore achieved: with reference to FIG. 5, all the passive and semi-active elements located in the low beam 42 are visible in the same conditions as in the case of conventional illumination. However, all the active elements, such as the headlights of the approaching vehicles, are observed with a brightness decreased by a factor α.

This is indeed the phenomenon that is observed, shown in FIGS. 6A and 6B.

FIG. 6A shows a conventional road scene, in which the road, the elements external to the road, the traffic signs and the headlights of the approaching vehicles can be seen.

FIG. 6B shows the same road scene, observed through the glasses 28 of the invention. Evidently, all the elements of this road scene are visible in the same conditions as in FIG. 6A, regardless of whether they are passive or semi-active elements such as traffic signs, with the exception of active elements such as the headlights of approaching vehicles, the brightness of which has been reduced.

Because of the invention, it is possible, by varying the duty cycle α, to maintain a constant visibility of the passive and semi-active elements, and to provide a desired reduction in the brightness of the active elements present in the road scene. Even if the headlights of approaching vehicles are dazzling, the invention enables their brightness to be reduced until they are less dazzling, without modifying the perception of the other details of the road scene.

The invention provides numerous further advantages. This is because, as shown in FIG. 7, the driver's 24 field of view includes, in addition to the road scene SR before him through the windshield 26, the dashboard of the vehicle 20 which shows various visual displays useful to the driver 24.

These visual displays may be dials 44 of speedometers or revolution counters, or indicator lights 46 indicating the operation of certain items of equipment of the vehicle. The dials 44 and the indicator lights 46 are switched on when the headlights 22 are switched on, and provide illuminated visual displays.

Figure 7:
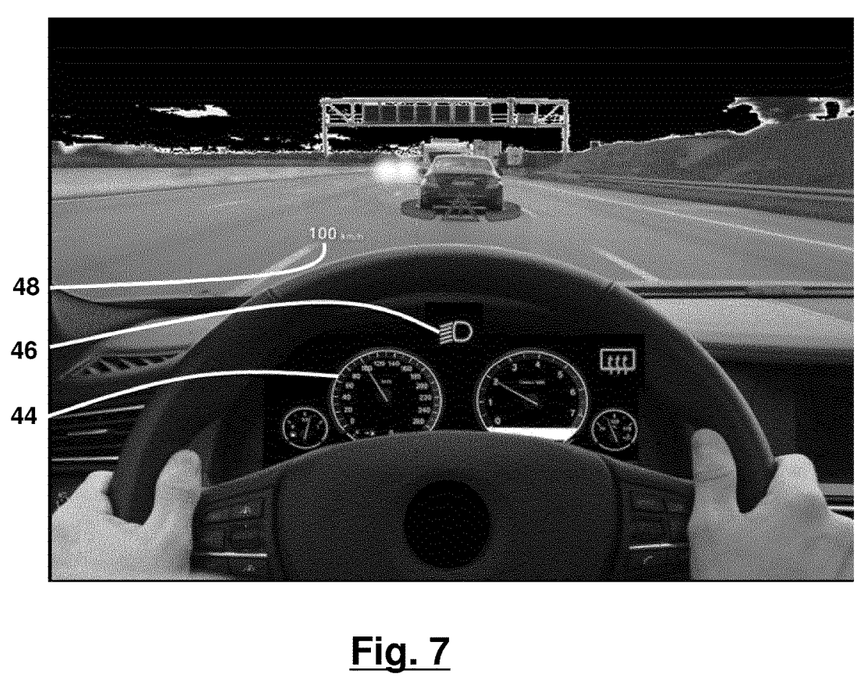
FIG. 7 shows the average field of view of a vehicle driver.

Other illuminated visual displays 48 may be presented to the driver outside the dashboard, for example as shown in FIG. 7, by a viewing system known in English as a "head up display" (HUD), forming a virtual image with the aid of the windshield 26.

These visual displays, presented by the vehicle dashboard or a viewing system, thus relate to the operation or to the environment of the vehicle (20), and are intrinsically important for safety. The driver should therefore have the clearest possible view of them. The invention also enables this result to be obtained, by providing for the switching on of these visual displays to be synchronized with the variation of the coefficient of transmission of the variable-transmission screen, in this case the glasses 28.

According to the invention, the brightness of the visual displays 44, 46 and/or 48 is increased by a factor equal to the inverse of the duty cycle α during the time $t_1$. Thus the glasses 28 have the effect of weakening the brightness of all the objects located in the driver's field of view, with the exception of:
- the road scene illuminated by his own headlights,
- the visual displays, the dashboard or the head up display system.

Another potential source of inconvenience for the driver is the interior lighting system of the vehicle, when for example one or more passengers wish to use it in order to read. The use of the ceiling light 60, as shown symbolically in FIG. 1, may disturb the driver by illuminating details in his field of view which may distract his attention.

The present invention also enables this problem to be overcome. This is because the invention may provide for the interior lighting 60 to be switched on only during the periods $t_2$, that is to say during the periods when the glasses lenses 28 are opaque. The fact that the interior lighting is switched on is then not perceived by the driver, whereas the passengers may use the lighting as they wish.

Thus the invention provides glasses 28 which assist the driver 24 of a vehicle 20 by enabling him to improve his view of the road scene SR in front of his vehicle 20 both by day and by night.

The operation of these glasses 28 offers total safety, since if the headlights 22 are not switched on when the exterior brightness has become relatively low, because the driver 24 has disabled the automatic control of these headlights and has not actuated the manual switch-on control, the control unit 30 remains in "day" operating mode, and therefore controls the glasses lenses 28 in such a way that they have maximum transparency.

In "day" operating mode, the coefficient of transmission of the lenses 28 is adjusted in real time as a function of the brightness of the road scene SR observed by the driver: as the brightness increases, the glasses 28 lenses become darker, and vice versa.

In "night" operating mode, the glasses 28 enable the driver 24 to have the following in his field of view:
- all the passive and semi-active elements illuminated in the road scene SR by the low beam emitted by the headlights of his vehicle 20, with a luminous intensity equal to that which is customary for him,
- all the active elements, with a reduced luminous intensity, the reduction being fixed or variable by changing the common duty cycle of his headlights and of his glasses lenses 28, and
- all the visual displays relating to the nighttime driving of the vehicle, also with a luminous intensity equal to that which is customary for him, and without being inconvenienced by other light sources of the vehicle that he considers to be interfering, such as the ceiling light of the passenger compartment.

Clearly, the present invention is not limited to the embodiments which have been described; in fact, persons skilled in the art may make numerous modifications to the invention, all of which fall within its scope.

Thus, in "day" operating mode, the driver 24 of the vehicle 20 and his passengers may each wear adaptive glasses 28 according to the invention, each of the pairs of glasses 28 receiving the same control signal as a function of the brightness outside the vehicle 20. A person skilled in the art may provide for the glasses 28 to include an adapter, enabling their wearer to modulate the degree of attenuation provided by the glasses lenses 28, according to each wearer's visual sensitivity. Thus, a passenger may adjust his glasses 28 so that they darken to a lesser extent than those of the driver 24 if the road scene SR is intensely illuminated.

Similarly, in "night" operating mode, a person skilled in the art may provide a variable-transmission screen according to the teachings of the present invention, which is not formed by glasses lenses 28, but by a screen which can be folded away like a sun visor, or by the windshield of the vehicle. It will then be possible to use two successive variable-transmission screens, for example:

the windshield 26 and a movable screen of the sun visor type, to provide the upper part of the driver's 24 field of view (via the screen of the sun visor type and the windshield) with a greater attenuation than that of the lower part (via the windshield alone), or the windshield 26 and the glasses 28 worn by the driver 24. With this arrangement, the driver 24 will benefit from the fixed attenuation provided by the windshield 26, supplemented by an adjustable attenuation that he can control on the dashboard, while the passengers will benefit from the fixed attenuation provided by the windshield 26 alone.

The same glasses 28 may advantageously be used by the passengers in the vehicle 20, to prevent them from being dazzled in daytime by a sunlit road scene SR, and at night by the headlights of vehicles traveling in the opposite direction, or to enable them to switch on the ceiling light without inconveniencing the driver 24.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. Adaptive glasses for drivers or passengers of a motor vehicle, said glasses comprising lenses having a screen whose coefficient of transmission is variable between a maximum value (CTMAX) and a minimum value (CTmin),
wherein said coefficient of transmission (CT) of said glasses lenses is controlled according to a wireless communication protocol;
wherein said coefficient of transmission (CT) of said glasses lenses is controlled by a control unit;
wherein said control unit receives signals from a sensor for measuring a brightness of a road scene in front of said vehicle, and said signals from an ocular sensor for measuring a quantity of light transmitted through said glasses lenses, said control unit having a feedback loop for use in the control of the coefficient of transmission whereby said ocular sensor senses at least some of the light received by the eye that has already passed through the glasses lenses such that the amount of light reflected by a cornea of a driver's eye provides a measurement of an amount of light transmitted through said glasses lenses and reaching said driver's eye, said control unit using said sensed amount of light to control said coefficient of transmission;
wherein said ocular sensor of said quantity of light transmitted by said glasses lenses measures a quantity of light reflected by said cornea of said driver's eye.

2. The adaptive glasses as claimed in claim 1, wherein said coefficient of transmission (CT) of said glasses lenses is controlled by radio, infrared or ultrasonic waves.

3. The adaptive glasses as claimed in claim 1, wherein said measurement of said brightness of said road scene (SR) in front of said vehicle is made by a sensor located on an inner face of a windshield fitted on said vehicle.

4. The adaptive glasses as claimed in claim 2, wherein said coefficient of transmission of said glasses lenses is varied by said control unit, which controls in synchronization a variation of intensity of a light beam emitted by at least one headlight fitted to said vehicle.

5. The adaptive glasses as claimed in claim 4, wherein said control unit receives signals from a sensor for measuring a quantity of light transmitted by said glasses lenses.

6. The adaptive glasses as claimed in claim 4, wherein said coefficient of transmission (CT) of said glasses lenses is controlled in synchronization with luminous visual displays presented by a vehicle dashboard and relating to the operation or the environment of said vehicle.

7. The adaptive glasses as claimed in claim 2, wherein said coefficient of transmission (CT) of said glasses lenses is controlled in synchronization with an interior lighting of said vehicle, said interior lighting being switched on only when said coefficient of transmission (CT) of said variable-transmission screen is at its minimum value ($CT_{min}$).

8. The adaptive glasses as claimed in claim 1, wherein said glasses include their own electrical power supply.

9. The adaptive glasses as claimed in claim 1, wherein said glasses include a liquid crystal screen or a microelectromechanical system.

10. The adaptive glasses as claimed in claim 1, wherein said coefficient of transmission (CT) is variable according to a pulse width modulation (PWM) mode.

11. The adaptive glasses as claimed in claim 5, wherein said coefficient of transmission (CT) of said glasses lenses is controlled in synchronization with luminous visual displays presented by a vehicle dashboard and relating to the operation or the environment of said vehicle.

12. The adaptive glasses as claimed in claim 2, wherein said coefficient of transmission (CT) of said glasses lenses is controlled in synchronization with luminous visual displays presented by a vehicle dashboard and relating to the operation or the environment of said vehicle.

13. The adaptive glasses as claimed in claim 6, wherein said coefficient of transmission (CT) of said glasses lenses is controlled in synchronization with an interior lighting of said vehicle, said interior lighting being switched on only when said coefficient of transmission (CT) of said variable-transmission screen is at its minimum value ($CT_{min}$).

* * * * *